T. A. ERRETT.
MANDREL FOR WELDING SECTIONS OF SHEET METAL CONDUIT OR PIPE TOGETHER.
APPLICATION FILED MAR. 17, 1917.
1,240,326.
Patented Sept. 18, 1917.
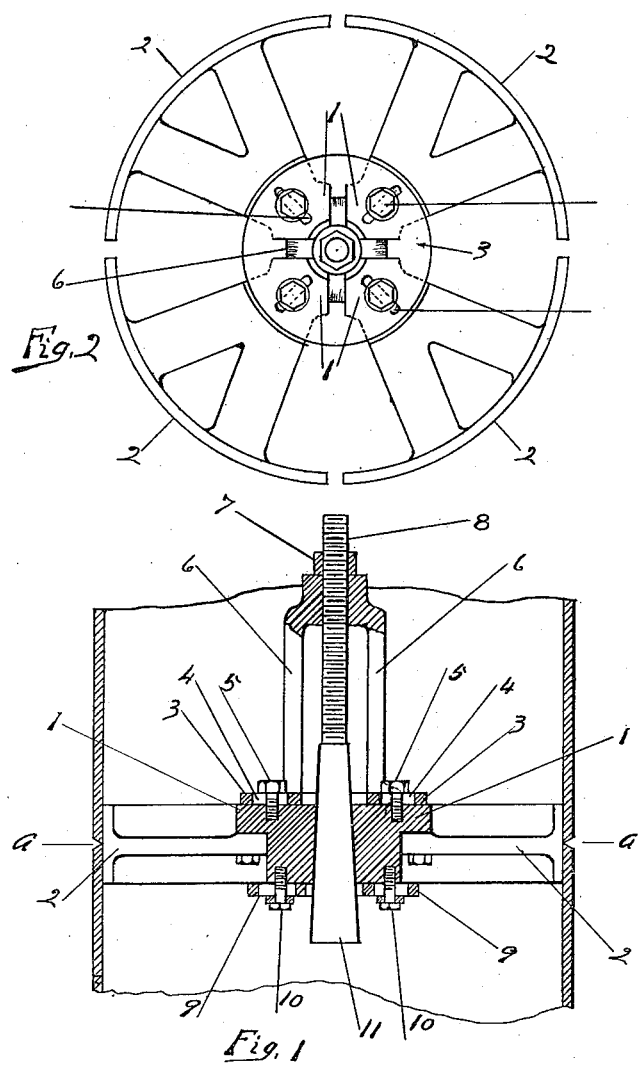

UNITED STATES PATENT OFFICE.

THOMAS A. ERRETT, OF PORTLAND, OREGON.

MANDREL FOR WELDING SECTIONS OF SHEET-METAL CONDUIT OR PIPE TOGETHER.

1,240,326.  Specification of Letters Patent.  Patented Sept. 18, 1917.

Application filed March 17, 1917. Serial No. 155,594.

*To all whom it may concern:*

Be it known that I, THOMAS A. ERRETT, a citizen of the United States, residing at Portland, in the county of Multnomah and State of Oregon, have invented a new and useful Improvement in Mandrels for Welding Sections of Sheet-Metal Conduit or Pipe Together, of which the following is a specification.

My invention relates to that class of mechanical operations by which liquid or gas conduits are built up from sheet metal by means of acetylene or electric welding, the advantages gained by my newly invented process being that the sections of conduit after having been curved and the longitudinal seams welded is, that the abutting ends of two sections to be welded together are held firmly in true alinement while being welded, and any melted metal is prevented from running through to the inside making a rough, uneven joint inside; also effectively preventing blow holes during the process of welding.

Reference now being had to the drawing of the apparatus, by means of which my process is made operative:

Figure 1 is a longitudinal section, and Fig. 2 an elevation. The same numerals of references are used for the same parts throughout.

1. Figs. 1 and 2, is the four part hub of a wheel mandrel, to which is bolted the four sections of the mandrel 2, which may be made to fit any size of conduit. 3 is a circular plate having slotted openings 4, through which the bolts 5 pass, being tapped into the hub 1; 6 is a four legged bracket affiixed upon the plate 3 and forms the top guide and seat for the nut 7 of the collet screw 8.

9 is a circular plate having slotted openings for assembly bolts 10, tapped into the hub members on the back side. The plurality of sections of the mandrel being held in position by the plates 3 and 9. It being understood that the mandrel is not necessarily formed of four sections, but a plurality of sections.

11 is a tapering collet, the upper end of which is formed into a screw, which being engaged by the nut 7 may be drawn through the hub 1, forcing it and the attached sections of the mandrel 2 out.

In operation of my newly invented process two sections of conduit, the longitudinal seams of which have been welded are brought together as at A, the central line of the mandrel being set at the joint, then by means of the collet, being drawn through the hub, forcing the members of the mandrel out, all irregularities are corrected in bending and bringing the two ends into perfect alinement and are held there for welding. It will also be noted that no metal can collect on the inside to make rough and obstruct the conduit; further that no blow holes can form during welding.

Having now described my invention, what I claim as my invention and desire to secure by Letters Patent, is:—

In an expanding mandrel for welding sections of sheet metal conduit, a separable hub, composed of a plurality of movable members each carrying work engaging means, a slotted front and back plate, bolts secured to the hub members and passing through the slots to secure the plates to said hub members, and a cone extending through the hub and slidably mounted to co-act with said hub members for imparting thereto a radial motion.

THOMAS A. ERRETT.

Witnesses:
 W. G. TOMPKINS,
 CHAS. E. MACE.

Copies of this patent may be obtained for five cents each, by addressing the "Commissioner of Patents, Washington, D. C."